(12) United States Patent
Gouko

(10) Patent No.: US 6,222,507 B1
(45) Date of Patent: Apr. 24, 2001

(54) COMPACT PERSONAL COMPUTER HAVING A PLURALITY OF DISPLAY PANELS

(75) Inventor: Junichi Gouko, Yamagata (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/196,087

(22) Filed: Nov. 19, 1998

(30) Foreign Application Priority Data

Nov. 19, 1997 (JP) .................................................. 9-318029

(51) Int. Cl.⁷ .................................................. G09G 5/00
(52) U.S. Cl. .................................................. 345/1; 361/681
(58) Field of Search .................................. 345/1, 4, 3, 5; 248/917, 918, 919, 920, 921, 922, 923; 348/552, 553; 40/605; 349/15; 361/681, 682

(56) References Cited

U.S. PATENT DOCUMENTS

| | | | |
|---|---|---|---|
| 5,128,662 | * | 7/1992 | Failla ........................................ 345/1 |
| 5,396,257 | * | 3/1995 | Someya et al. ............................ 345/1 |
| 5,537,766 | * | 7/1996 | Nickens et al. ........................... 40/605 |
| 5,784,035 | * | 7/1998 | Hagiwara et al. ......................... 345/3 |
| 5,926,153 | * | 7/1999 | Ohishi et al. .............................. 345/1 |
| 5,926,165 | * | 7/1999 | Grewer et al. ........................ 345/115 |

FOREIGN PATENT DOCUMENTS

| | | |
|---|---|---|
| 1-234927 | 9/1989 | (JP) . |
| 4-246721 | 9/1992 | (JP) . |
| 9-200648 | 7/1997 | (JP) . |

* cited by examiner

*Primary Examiner*—Steven Saras
*Assistant Examiner*—Fritz Alphonse

(57) ABSTRACT

In a personal computer which displays a plurality of images and which includes a body of the personal computer, a primary display panel provided on a front side of the body, and a secondary display panel provided adjacently to the primary display panel, the secondary display panel is slid to be contained into the primary display panel or outer sides of the primary display panel by the use of rack and pinion mechanism. The secondary display panel is rotatable towards both upper or lower side and left or right side with respect to the primary display panel by a hinge mechanism.

12 Claims, 3 Drawing Sheets

COMPACT PERSONAL COMPUTER HAVING A PLURALITY OF DISPLAY PANELS

BACKGROUND OF THE INVENTION

This invention relates to a personal computer having a plurality of display panels, and more particularly to a display apparatus or a display unit having a plurality of display panels.

It is a recent trend that a plurality of images are displayed simultaneously on a display panel of a personal computer. Nowadays, a personal computer having a plurality of display panels is proposed so that utility of a user of a personal computer is improved. An example of such a personal computer having a plurality of display panels is disclosed, as a first prior art, in unexamined Japanese Patent Publication Hei01-234927, namely 234927/1989. In the example disclosed therein, a plurality of monitors and connectors are provided in a personal computer with those monitors and connectors being separated with each other. Another example of such a personal computer having a plurality of display panels is disclosed, as a second prior art, in unexamined Japanese Patent Publication Hei04-246721, namely 246721/1992. In also the another example disclosed therein, another display monitors are added to an original display monitor with the original and the another display monitors being separated with each other. Still another example of a television and a personal computer each having a plurality of display panels are disclosed, as a third prior art, in unexamined Japanese Patent Publication Hei09 -200648, namely 200648/1997. In also the still another example disclosed therein, a plurality of video display panels each consisting of a cathode ray tube (CRT) or liquid crystal are combined to a personal computer. However, video display panels, floppy disk drives, connectors, or the like are located in a plurality of directions, respectively.

However, when a plurality of display apparatus are used in a personal computer, a large space is inconveniently required for location of such a plurality of display apparatus.

In the above-mentioned first, second and third prior arts, in order to see a plurality of images by a personal computer, a plurality of images are displayed in divided areas of a single display panel, respectively. Otherwise, a plurality of images are displayed in a single display panel with the images being overlapped on each other and a desirable image is seen by setting the desirable image in the forefront. However, when a plurality of images are displayed in divided areas of a single display panel, it is inevitably caused to occur that each image is too small to be seen comfortably. As a result, an efficiency of a job by the use of the personal computer becomes worse. On the other hand, when a plurality of images are displayed in a single display panel with the images being overlapped on each other, it is, of course, impossible to see a plurality of images simultaneously.

SUMMARY OF THE INVENTION

It is therefore an object of the present invention to provide a compact personal computer which has a plurality of display panels.

It is another object of the present invention to provide a display apparatus for use in a personal computer, which has a plurality of display panels.

Other objects of this invention will become clear as the description proceeds.

According to an aspect of the present invention, there is provided a personal computer which displays a plurality of images, comprising: a body of the personal computer; a primary display panel provided on a front side of the body; and at least one secondary display panel which is provided adjacently to the primary display panel.

The primary display panel may have a space between a display surface and a back surface thereof, the secondary display panel being slid to be contained into the space.

A rack may be integrally provided on the secondary display panel while a pinion may be provided on the primary display panel, the rack and the pinion being adjusted to be operable as rack and pinion mechanism, the secondary display panel being slid to be contained into the space by the use of the rack and pinion mechanism.

The primary display panel may have a display surface thereof, the secondary display panel being slid to be contained in a front side of the display surface.

The primary display panel may have a back surface thereof, the secondary display panel being slid to be contained in a rear side of the back surface.

The secondary display panel may be set adjacently to the primary display panel by a predetermined angle with respect to the primary display panel, the personal computer further comprising a hinge mechanism for use in adjusting the predetermined angle.

The hinge mechanism may consist of an uniaxial hinge, the secondary display panel being rotatable around the uniaxial hinge towards both upper and lower sides with respect to the primary display panel.

The hinge mechanism may consist of a biaxial hinge including first and second axes, the secondary display panel being rotatable around the first axis towards both upper and lower sides with respect to the primary display panel, the secondary display panel being rotatable around the second axis towards both left and right sides with respect to the primary display panel.

The personal computer may be a notebook-size personal computer.

The personal computer may be a desktop personal computer.

According to another aspect of the present invention, there is provided a display apparatus which is for use in combination with a personal computer and which displays a plurality of images, comprising: a body of the display apparatus; a primary panel provided on a front side of the body; and at least one secondary panel which is provided adjacently to the primary panel.

DESCRIPTION OF THE PREFERRED EMBODIMENTS

Figure 1:
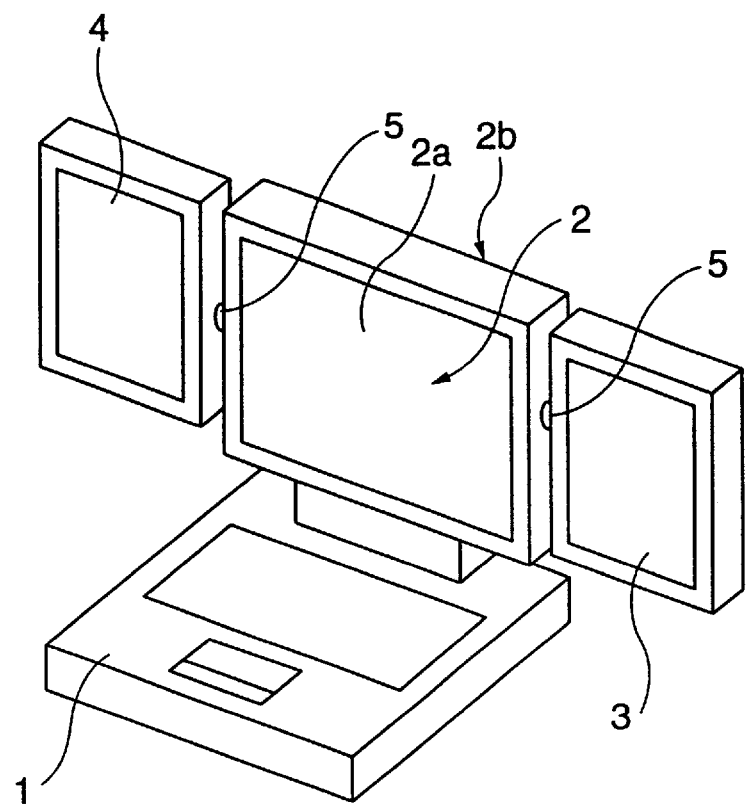
FIG. 1 is a schematic perspective view for showing a structure of a personal computer having a plurality of display panels according to a first embodiment of the present invention.
Figure 2:
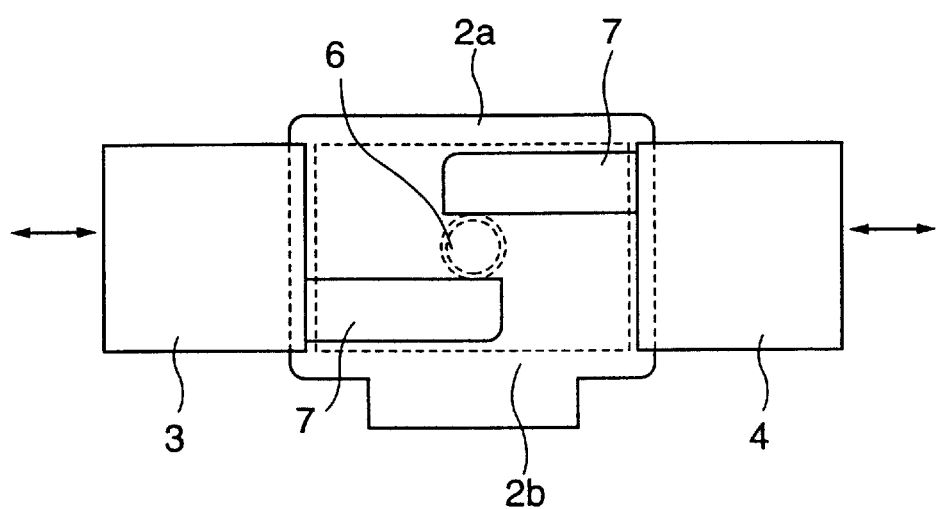
FIG. 2 is a schematic plan view for explaining a method of containing secondary display panels in the personal computer illustrated in FIG. 1.

Referring to FIGS. 1 and 2, description will proceed to a personal computer according to a first embodiment of the present invention. FIG. 1 is a schematic perspective view of the personal computer according to the first embodiment.

As will be understood from FIG. 1, the present invention is applied to a notebook-size personal computer in the first embodiment.

As illustrated in FIG. 1, the notebook-size personal computer comprises a body 1, a main panel 2 provided on a front side of the body 1 as a primary display panel, sub panels 3 and 4 each of which is provided adjacently to the main panel 2 as a secondary display panel with a predetermined angle against the main panel 2, and a hinge mechanism 5 for use in adjusting the predetermined angle between the main panel 2 and sub panels 3, 4.

FIG. 2 is a schematic plan view for showing a method of containing the sub panels 3, 4.

In the first embodiment, the sub panels 3, 4 are slid to be contained into a space formed in the back side of the main panel 2 or on the back side of the main panel 2. Namely, the main panel 2 has a space between a display surface 2a and a back surface 2b thereof. As will be understood from FIG. 2, the sub panels 3 or 4 is slid to be contained into the space from right or left hand side of FIG. 2, respectively. As shown in FIG. 2, a pinion 6 is provided on a central portion of the space while each rack 7 is integrally provided in one end of each sub panel 3 or 4. Each sub panel 3 or 4 is slid into the space to be contained therein by the combination of each rack 7 and the pinion 6, as depicted by a straight line having arrows in both ends thereof.

Figure 3:
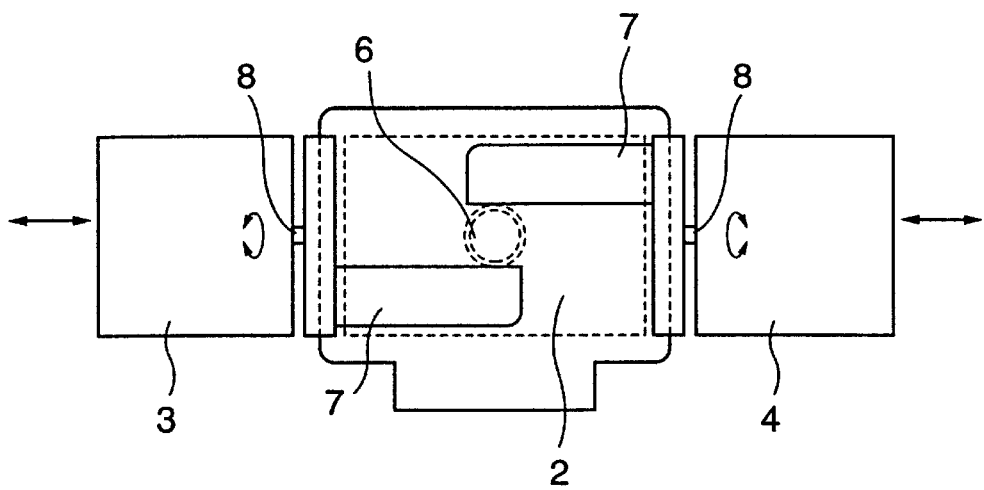
FIG. 3 is a schematic plan view for explaining a method of containing secondary display panels in a personal computer having a plurality of display panels according to a second embodiment of the present invention.

Referring to FIG. 3, description proceed to a personal computer according to a second embodiment of the present invention. FIG. 3 is a schematic plan view for showing a method of adjusting angles between the main panel 2 and each sub panels 3, 4 in the second embodiment. Besides, the personal computer according to the second embodiment is a notebook-size personal computer similarly to that of the first embodiment. The notebook-size personal computer in the second embodiment has a structure similar to that of the first embodiment except that a mechanism for adjusting angles between sub panels 3, 4 and the main panel 2 is added in the second embodiment. Similar portions are designated by like reference numerals.

As illustrated in FIG. 3, the notebook-size personal computer further comprises a hinge mechanism for use in adjusting the predetermined angle. The hinge mechanism consists of an uniaxial hinge 8, 8. The sub panels 3 and 4 are rotatable around the uniaxial hinge 8, 8, respectively towards both upper and lower sides with respect to the main panel 2, as depicted by a substantially circular line having arrows in both ends thereof.

Figure 4:
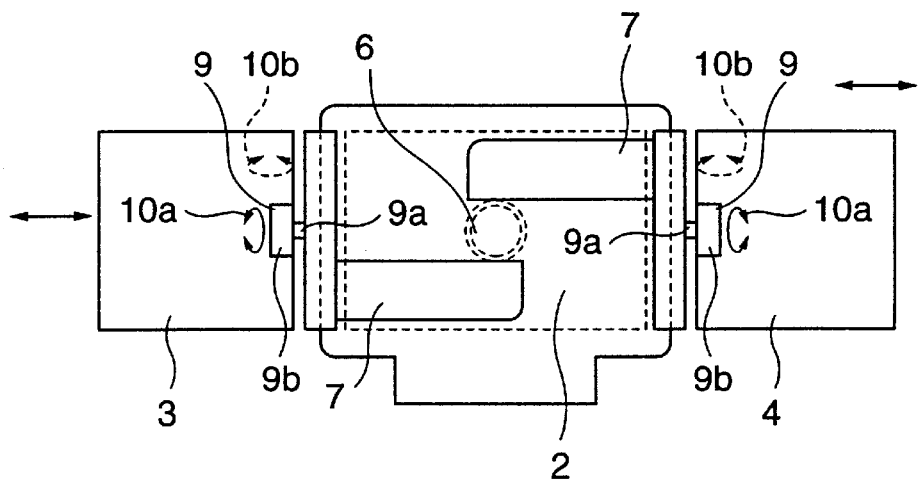
FIG. 4 is a schematic plan view for explaining a method of containing secondary display panels in a personal computer having a plurality of display panels according to a third embodiment of the present invention.

Referring to FIG. 4, description proceed to a personal computer according to a third embodiment of the present invention. FIG. 4 is a schematic plan view for showing a method of adjusting angles between the main panel 2 and each sub panels 3, 4 in the third embodiment. Besides, the personal computer according to the third embodiment is a notebook-size personal computer similarly to those of the first and the second embodiments. The notebook-size personal computer in the third embodiment has a structure similar to that of the second embodiment except that a hinge mechanism consists of a biaxial hinge for adjusting angles between sub panels 3, 4 and the main panel 2 not only in upper and lower directions but also in forward and backward directions.

As illustrated in FIG. 4, the notebook-size personal computer further comprises a hinge mechanism 9, 9 each of which includes two axes, namely first and second axes 9a and 9b. The sub panels 3 and 4 are rotatable around the first axis 9a, respectively towards both upper and lower sides with respect to the main panel 2, as depicted by a substantially circular line 10a having arrows in both ends thereof. Furthermore, the sub panels 3 and 4 are rotatable around the second axis 9b, respectively towards both forward and backward sides with respect to the main panel 2, as depicted by a substantially circular broken line 10b having arrows in both ends thereof.

Figure 5:
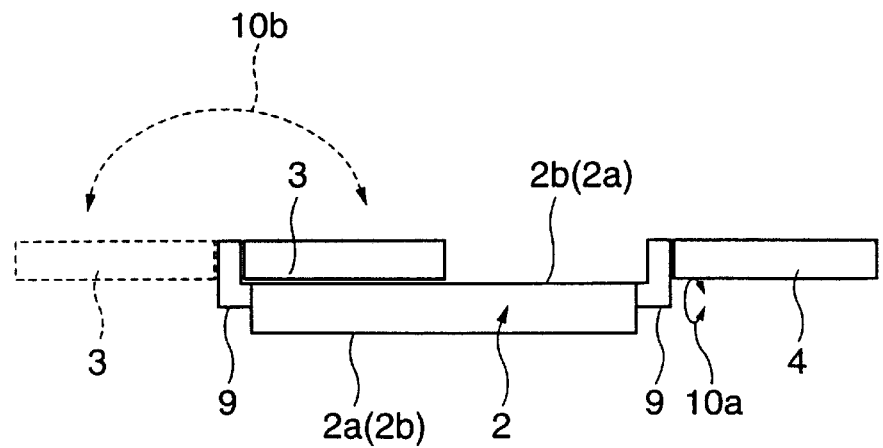
FIG. 5 is a schematic side view for explaining a method of containing secondary display panels in a personal computer having a plurality of display panels according to a fourth embodiment of the present invention.

Referring to FIG. 5, description proceed to a personal computer according to a fourth embodiment of the resent invention, FIG. 5 is a schematic side view for showing a method of containing sub panels 3, 4 in the fourth embodiment. Besides, the personal computer according to the fourth embodiment is a notebook-size personal computer similarly to those of the first, the second and the third embodiments. The notebook-size personal computer in the fourth embodiment has a structure similar to that of the third embodiment except that the notebook-size personal computer does not have a rack and pinion mechanism. The notebook-size personal computer in the fourth embodiment has only a biaxial hinge mechanism similar to that of the third embodiment.

As illustrated in FIG. 5, the notebook-size personal computer comprises a hinge mechanism 9, 9 each of which includes two axes, namely first and second axes 9a (not shown) and 9b (not shown). The sub panels 3 and 4 are rotatable around the first axis 9a (not shown) respectively towards both upper and lower sides with respect to the main panel 2, as depicted by a substantially circular line 10a having arrows in both ends thereof. Furthermore, the sub panels 3 and 4 are rotatable around the second axis 9b (not shown), respectively towards a forward or a backward side with respect to the main panel 2, as depicted by a substantially semi-circular broken line 10b having arrows in both ends thereof. As a result, the sub panels 3 and 4 can be folded to be contained on the front side 2b of the main panel 2 or on the rear side 2a of the main panel 2.

Figure 6:
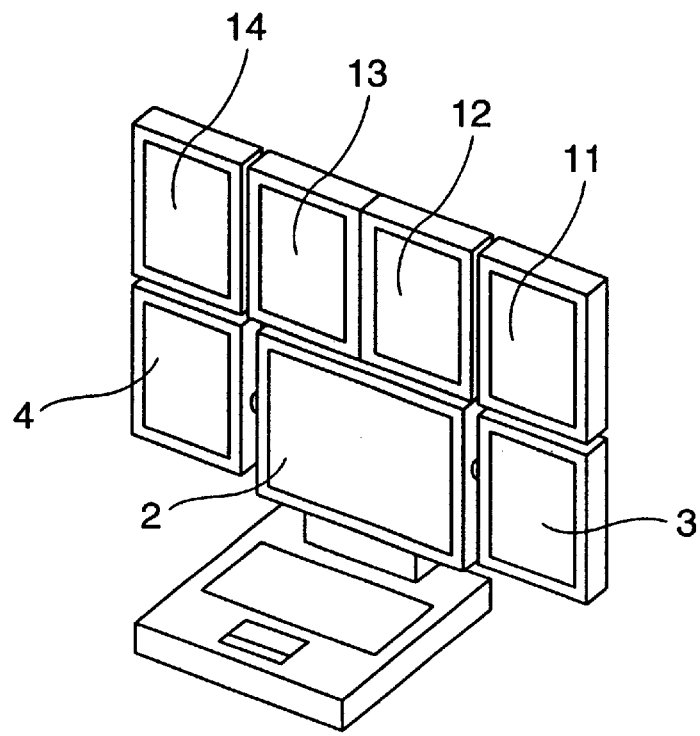
FIG. 6 is a schematic perspective view for showing a structure of a personal computer having a plurality of display panels according to a fifth embodiment of the present invention.

Referring to FIG. 6, description proceed to a personal computer according to a fifth embodiment of the present invention. FIG. 6 is a schematic perspective view for showing a notebook-size personal computer according to the fifth embodiment.

As illustrated in FIG. 6, the notebook-size personal computer further comprises four sub panels 11, 12, 13 and 14 above the main panel 2 and the sub panels 3, 4. The sub panels 12 and 13 are positioned above the main panel 2. In addition, the sub panel 11 is positioned above the sub panel 3 while the sub panel 14 is positioned above the sub 4. The sub panels 11, 12, 13 and 14 as well as the sub panels 2 and 3 are contained by a manner similar to those of the first through fourth embodiments. Further, angles of the sub panels 11, 12, 13 and 14 as well as the sub panels 2 and 3 against the main panel 2 are adjusted by a manner similar to those of the first through fourth embodiments.

Figure 7:
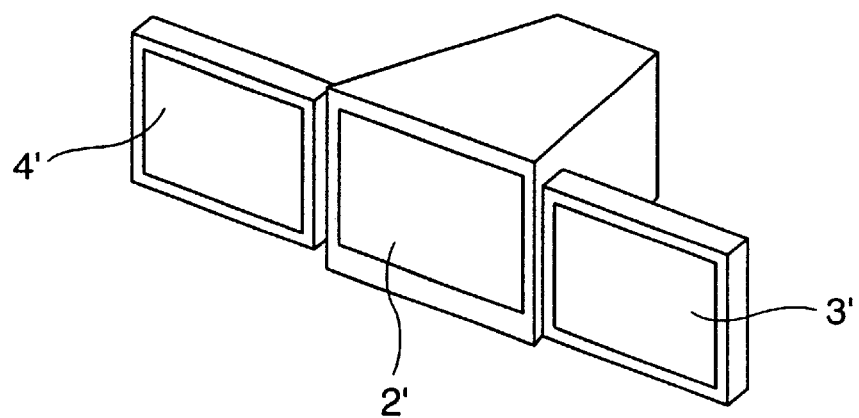
FIG. 7 is a schematic perspective view for showing a structure of a personal computer having a plurality of display panels according to a sixth embodiment of the present invention, in which the present invention is applied to a desktop personal computer.

Referring to FIG. 7, description proceed to a personal computer according to a sixth embodiment of the present invention. The present invention is applied to a desktop personal computer in the sixth embodiment. FIG. 7 is a schematic perspective view for showing the desktop personal computer in the sixth embodiment.

As illustrated in FIG. 7, the desktop personal computer has a cathode ray tube (CRT) display panel 2' as a primary display panel The desktop personal computer further has sub panels 3' and 4' each of which is provided adjacently to the CRT display panel 2' as a secondary display panel. The sub panels 3' and 4' are contained by a manner similar to those of the first through fifth embodiments. Further, angles of the sub panels 3' and 4' against the CRT display panel 2' are adjusted by a manner similar to those of the first through fifth embodiments. Thus, an essence of the present invention can be employed in such a desktop personal computer as illustrated in FIG. 7.

As mentioned above, in the conventional personal computer, it is required that a plurality of display apparatus are located, respectively. As a result, a wide space is inevitably required for the location of all the display apparatus. On the contrary, the personal computer in the present invention has a plurality of display panels formed integrally with a body of the personal computer itself. Accordingly, a plurality of images can be displayed by the personal computer, as far as a space for locating the personal computer itself is achieved. Thus, saving of a location space can be achieved by the present invention.

Further, as also mentioned in the preamble of the instant specification, a plurality of images are displayed in divided areas of a single display panel, respectively in the conventional personal computer. However, when a plurality of images are displayed in divided areas of a single display panel, it is inevitably caused to occur that each image is too small to be seen comfortably. According to the present invention, the personal computer has a plurality of display panels themselves. Consequently, a plurality of images are displayed in such a plurality of display panels, respectively divided into one display panel. Therefore, an image displayed therein can become larger in size. On the other hand, if a displayed image is kept in a same size as that displayed only in one panel with the other images, the numbers of the images simultaneously displayed in the main and sub panels can be further increased. In the interim, certain data sometimes requires a very wide display area. The present invention is particularly advantageous in such a case. For example, a working area can be displayed in the main panel while left and right areas or upper and lower areas can be displayed in the sub panels, respectively. Accordingly, a display area for showing such data can be enlarged by the sub panels in the present invention. Moreover, when a user enjoys, for example, a car chase or a car driving game by the use of the personal computer, a scene around the car can be displayed in a real manner by being divided into the sub panels, respectively. Thus, the personal computer of the present invention can be used in enjoying three-dimensional (3D) game, or the like.

While the present invention has thus far been described in conjunction with only several embodiments thereof, it will now be readily possible for one skilled in the art to put the present invention into effect in various other manners.

For example, numbers of the sub panels are not restricted to those depicted in the above-mentioned embodiments. Namely, the numbers of the sub panels can be further increased. In such a case, the increased sub panels are contained in a manner similar to the above-mentioned embodiments. Further, the angles of the increased sub panels against the main panel are also adjusted in a manner similar to the above-mentioned embodiments.

Moreover, in the above-mentioned several embodiments, the present invention was applied to a notebook-size or a desktop personal computer having a display panel integrally formed with a body of a computer itself. However, the present invention can also be applied to a display apparatus provided separately with a body of a computer itself.

What is claimed is:

1. A personal computer which displays a plurality of images, comprising:

a body of said personal computer having a front side and a back side, said front side and said back side are separated from each other with a space;

a primary display panel provided on a front side of said body;

a rack and a pinion device having at least a first rack, said pinion is attached to the back side of said body; and at least one secondary display panel integrally attached to said first rack attached to said body of said personal computer.

2. A personal computer as claimed in claim 1, wherein said at least one secondary body includes a display panel is contained partially into said space separating said front side from said back side.

3. A personal computer as claimed in claim 2, further comprising a second rack.

4. A personal computer as claimed in claim 1, wherein said primary display panel has a display surface and a back surface, said secondary display panel is angularly displaced to be contained in front of said display surface.

5. A personal computer as claimed in claim 3, wherein said second rack is integrally attached to said at least one secondary body.

6. A personal computer as claimed in claim 1, wherein said secondary display panel is contained in a rear side of said back surface.

7. A personal computer as claimed in claim 6, wherein said secondary display panel is contained in a rear side of said back surface by utilizing said rack and pinion mechanism.

8. A personal computer as claimed in claim 1, computer further comprising a hinge mechanism for adjusting said at least one secondary body to a predetermined angle.

9. A personal computer as claimed in claim 8, wherein said hinge mechanism consists of an uniaxial hinge, said secondary display panel is rotatable around said uniaxial hinge toward both an upper side and a lower side of said primary display panel.

10. A personal computer as claimed in claim 8, wherein said hinge mechanism consists of a biaxial hinge including first and second axes, said secondary display panel is rotatable around said first axis toward both an upper side and a lower side of said primary display panel, said secondary display panel is rotatable around said second axis towards both a left side and a right side of said primary display panel.

11. A personal computer as claimed in claim 1, wherein said personal computer is a notebook-size personal computer.

12. A personal computer as claimed in claim 1, wherein said personal computer is a desktop personal computer.

* * * * *